US009631500B2

(12) United States Patent
Pierre et al.

(10) Patent No.: US 9,631,500 B2
(45) Date of Patent: Apr. 25, 2017

(54) BUCKET ASSEMBLY FOR USE IN A TURBINE ENGINE

(71) Applicant: General Electric Company, Schenectady, NY (US)

(72) Inventors: Sylvain Pierre, Greer, SC (US); Holly Davis Brown, Greenville, SC (US)

(73) Assignee: General Electric Company, Schenectady, NY (US)

( * ) Notice: Subject to any disclaimer, the term of this patent is extended or adjusted under 35 U.S.C. 154(b) by 661 days.

(21) Appl. No.: 14/066,928

(22) Filed: Oct. 30, 2013

(65) Prior Publication Data

US 2015/0118062 A1    Apr. 30, 2015

(51) Int. Cl.
| | | |
|---|---|---|
| F01D 5/22 | (2006.01) | |
| B23P 15/04 | (2006.01) | |
| F01D 25/12 | (2006.01) | |
| F01D 5/18 | (2006.01) | |
| B23P 15/00 | (2006.01) | |

(52) U.S. Cl.
CPC .............. *F01D 5/225* (2013.01); *B23P 15/04* (2013.01); *F01D 5/187* (2013.01); *F01D 25/12* (2013.01); *B23P 15/006* (2013.01); *Y10T 29/49332* (2015.01)

(58) Field of Classification Search
None
See application file for complete search history.

(56) References Cited

U.S. PATENT DOCUMENTS

| 2,879,028 A | * | 3/1959 | Stalker | ................... F01D 5/183 |
| | | | | 416/219 R |
| 4,662,824 A | | 5/1987 | Ortolano | |
| 5,667,361 A | * | 9/1997 | Yaeger | ..................... F01D 5/22 |
| | | | | 416/193 R |
| 5,695,323 A | | 12/1997 | Pfeifer et al. | |
| 8,105,038 B2 | | 1/2012 | Ootomo et al. | |
| 2011/0194943 A1 | * | 8/2011 | Mayer | ..................... F01D 5/22 |
| | | | | 416/97 R |
| 2012/0027616 A1 | | 2/2012 | Merrill et al. | |

* cited by examiner

*Primary Examiner* — Igor Kershteyn
*Assistant Examiner* — Justin Seabe
(74) *Attorney, Agent, or Firm* — Armstrong Teasdale LLP (57) ABSTRACT

An assembly for use in a turbine engine is provided. The assembly includes a first bucket, a second bucket circumferentially adjacent to the first bucket, a shroud extending between the first and second buckets, and an aerodynamic shell substantially encircling the shroud such that a cavity is formed between the aerodynamic shell and the shroud.

18 Claims, 8 Drawing Sheets

BUCKET ASSEMBLY FOR USE IN A TURBINE ENGINE

BACKGROUND OF THE INVENTION

The subject matter disclosed herein relates generally to turbine engines, and more particularly, to bucket assemblies for use in turbine engines.

At least some known turbine engines include rotary assemblies that include a plurality of buckets or blades. To control airfoil stresses, deflections, and vibration characteristics, such rotary assemblies may include part-span connectors that extend between adjacent buckets. However, known part-span connectors are generally located in a turbine flowpath, and as such, may introduce aerodynamic losses into the system.

To counteract potential aerodynamic losses, at least some known rotary assemblies include a part-span connector fabricated with an aerodynamic shape. However, adding additional material to the part-span connector to create the aerodynamic shape may result in providing a part-span connector that is significantly larger and heavier than a non-aerodynamic part-span connector that primarily only provides mechanical support. Accordingly, using aerodynamic part-span connectors may increase the cost to manufacture the part-span connectors.

BRIEF DESCRIPTION OF THE INVENTION

In one aspect, an assembly for use in a turbine engine is provided. The assembly includes a first bucket, a second bucket circumferentially adjacent to the first bucket, a shroud extending between the first and second buckets, and an aerodynamic shell substantially encircling the shroud such that a cavity is formed between the aerodynamic shell and the shroud.

In another aspect, a rotary assembly is provided. The rotary assembly includes a rotor shaft, a hub coupled to the rotor shaft, a plurality of buckets coupled to the hub such that the buckets extend radially outward from the rotor shaft, a shroud extending between a first bucket of the plurality of buckets and a second bucket of the plurality of buckets, and an aerodynamic shell substantially encircling the shroud such that a cavity is formed between the aerodynamic shell and the shroud.

In yet another aspect, a method of assembling a rotary assembly is provided. The method includes coupling a first bucket to a hub, coupling a second bucket to the hub, wherein a first shroud component extending from the first bucket and a second shroud component extending from the second bucket form a shroud, positioning an aerodynamic shell around the shroud such that a cavity is formed between the aerodynamic shell and the shroud.

DETAILED DESCRIPTION OF THE INVENTION

The systems and methods described herein provide an aerodynamic shell that substantially encircles a shroud extending between two buckets. The shroud provides mechanical support for the buckets, while the aerodynamic shell provides an aerodynamic profile that facilitates fluid flow. A cavity defined between the shell and the shroud enables the assembly to be relatively light-weight while still providing sufficient mechanical and aerodynamic characteristics.

Figure 1:
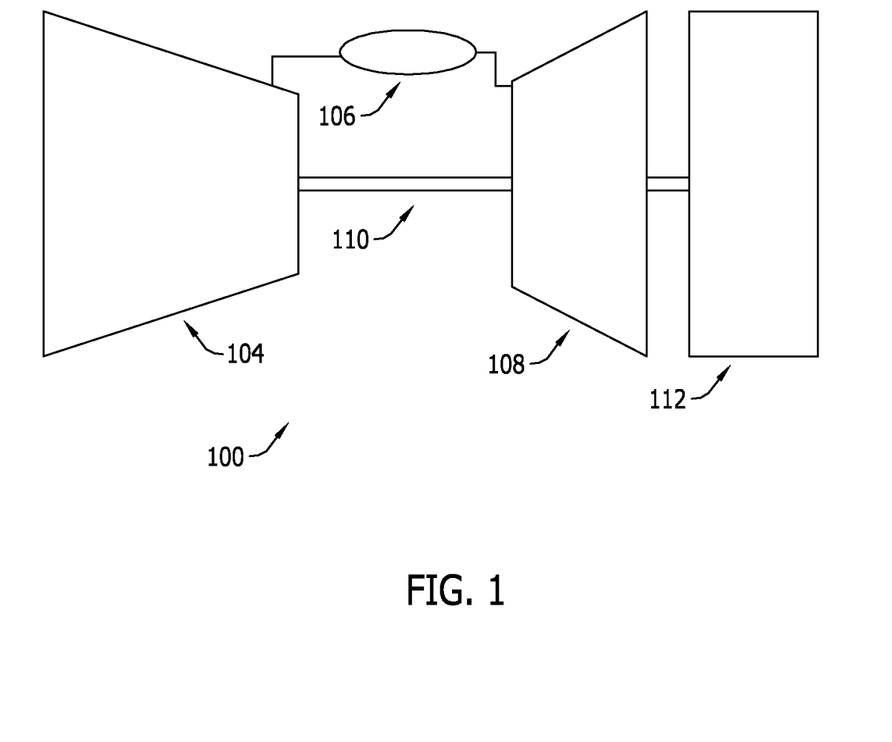
FIG. 1 is a schematic cross-sectional view of an exemplary turbine engine assembly.

FIG. 1 is a schematic cross-sectional view of an exemplary turbine engine assembly 100. More specifically, turbine engine assembly 100 is a gas turbine engine assembly. While the exemplary embodiment illustrates a gas turbine engine assembly, the disclosure is not limited to any one particular engine, and one of ordinary skill in the art will appreciate that the current invention may be used in connection with other turbine engines (e.g., steam turbine engines) or other rotary machines.

In the exemplary embodiment, turbine engine assembly 100 includes, coupled in a serial flow arrangement, a compressor 104, a combustor assembly 106, and a turbine 108 that is rotatably coupled to compressor 104 via a rotor shaft 110.

During operation, in the exemplary embodiment, ambient air is channeled through an air inlet (not shown) towards compressor 104. The ambient air is compressed by compressor 104 prior it to being directed towards combustor assembly 106. In the exemplary embodiment, compressed air is mixed with fuel, and the resulting fuel-air mixture is ignited within combustor assembly 106 to generate combustion gases that are directed towards turbine 108. Moreover, in the exemplary embodiment, turbine 108 extracts rotational energy from the combustion gases and rotates rotor shaft 110 to drive compressor 104. Furthermore, in the exemplary embodiment, turbine engine assembly 100 drives a load 112, such as a generator, coupled to rotor shaft 110. In the exemplary embodiment, load 112 is downstream of turbine engine assembly 100. Alternatively, load 112 may be upstream from turbine engine assembly 100.

Figure 2:
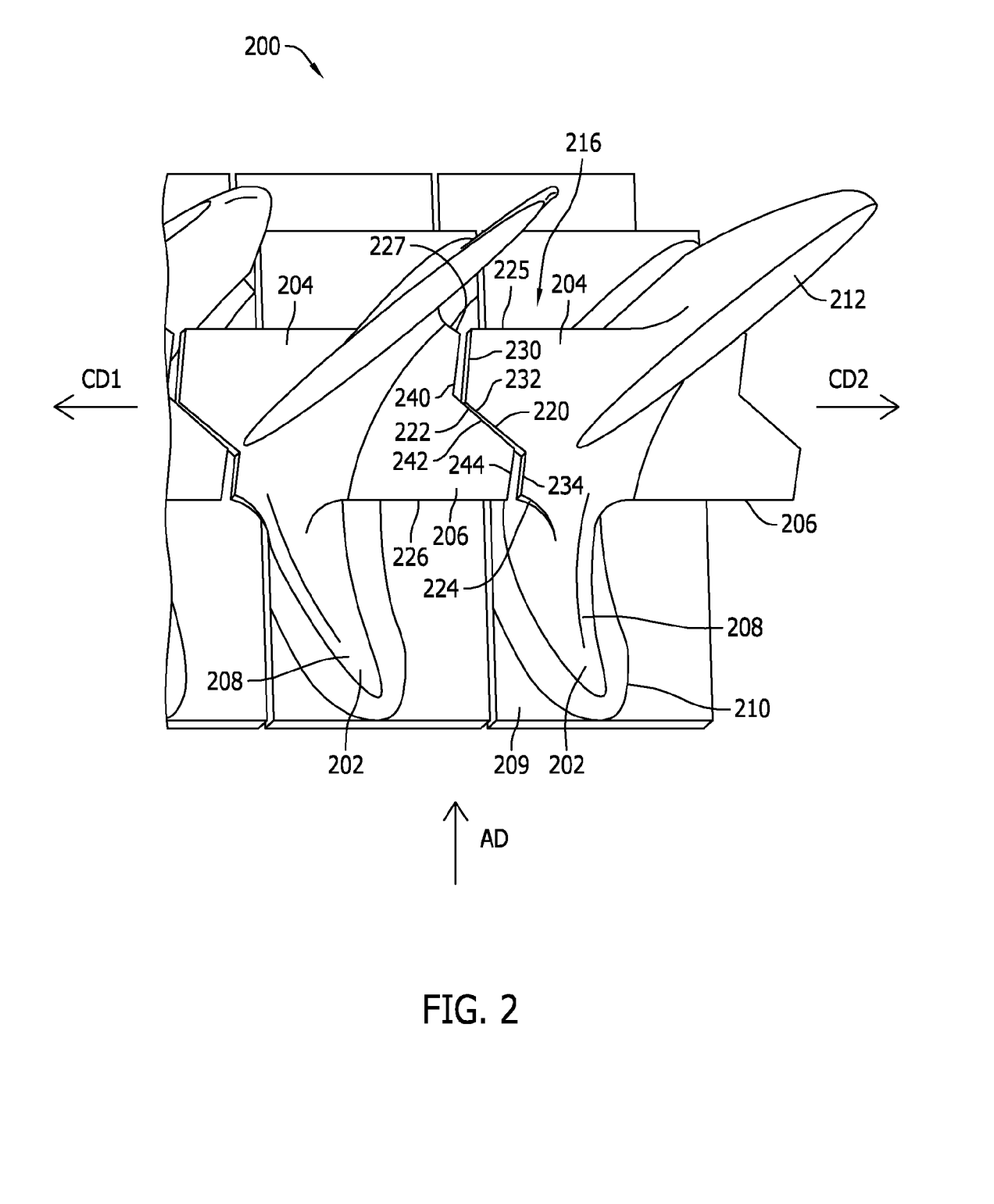
FIG. 2 is a top view of a portion of an exemplary rotary assembly that may be used with the turbine engine assembly shown in FIG. 1.

FIG. 2 is a top view of a portion of a rotary assembly 200 that includes a plurality of bucket assemblies 202. Rotary assembly 200 may be included in, for example, turbine 108 of turbine engine assembly 100 (both shown in FIG. 1). Each bucket assembly 202 includes a first shroud component 204 and a second shroud component 206 extending from a bucket 208. Specifically, first shroud component 204 extends in a first circumferential direction, CD1, and second shroud component 206 extends in a second circumferential, CD2, opposite the first circumferential direction. First and second circumferential directions CD1 and CD2 are orthogonal to an axial direction AD of rotary assembly 200. Buckets 208 are coupled to a hub 209, extend radially outward from a shaft, such as rotor shaft 110 (shown in FIG. 1), and extend from a base 210 to a tip 212.

First and second shroud components 204 and 206 form a shroud 216. Specifically, first shroud component 204 on a bucket 208 and second shroud component 206 on an adjacent bucket 208 form shroud 216. First shroud component 204 includes a circumferential edge 220 and second shroud component 206 includes a circumferential edge 222 complementary to first circumferential edge 220. First shroud component 204 includes a leading edge 224 and a trailing edge 225, and second shroud component 206 includes a leading edge 226 and a trailing edge 227.

In the exemplary embodiment, first shroud component circumferential edge 220 includes a first face 230, a second face 232 oriented obliquely to first face 230, and a third face 234 oriented substantially parallel to first face 230. Similarly, second component circumferential edge 222, includes a first face 240, a second face 242 oriented obliquely to first face 240, and a third face 244 oriented substantially parallel to first face 240. Alternatively, first and second shroud components 204 and 206 may have edges 220 and 222 with any shapes that are complementary to one another.

Shroud 216 facilitates raising the natural frequencies of buckets 208 and provides friction damping for buckets 208. Shroud 216 also facilitates minimizing failure modes such as, but not limited to, high cycle fatigue failure of buckets 208.

To provide support for buckets 208, shroud 216 is relatively solid and/or stiff. However, during operation of turbine engine assembly 100, fluids (e.g., gas, air) flow past bucket assembly 202. To facilitate fluid flow, bucket assembly 202 should have a relatively aerodynamic shape. However, adding additional material to shroud 216 to give shroud 216 an aerodynamic shape increases a mass of shroud 216, which may negatively impact hub stress due to additional pull load and aerodynamic blockage due to increased connecting fillet size.

Figure 3:
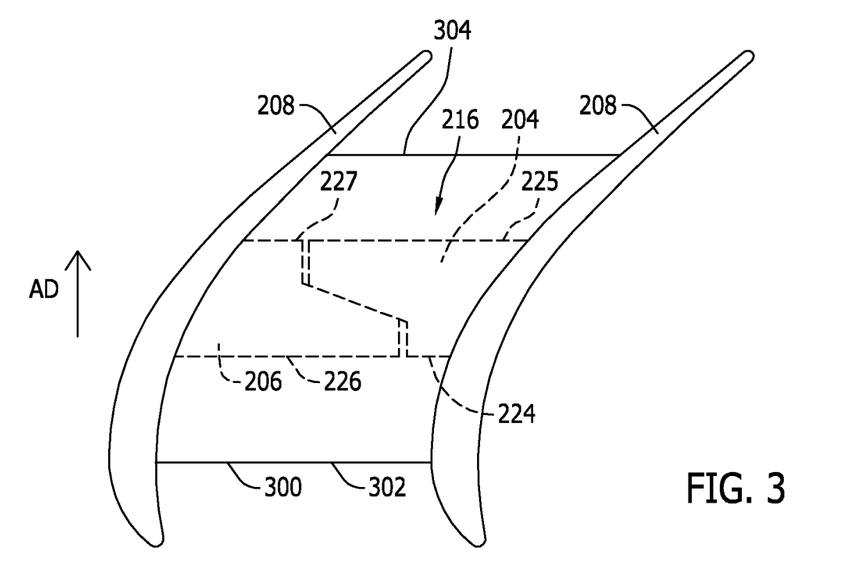
FIG. 3 is a schematic top view of two adjacent buckets and a shell surrounding a shroud that may be used with the rotary assembly shown in FIG. 2.
Figure 4:
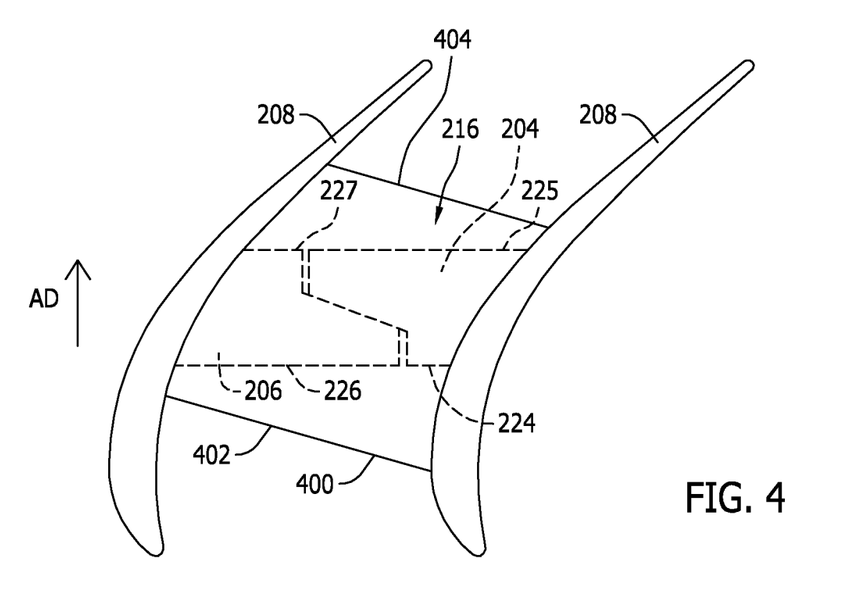
FIG. 4 is a schematic top view of two adjacent buckets and a shell surrounding a shroud that may be used with the rotary assembly shown in FIG. 2.

Accordingly, in the exemplary embodiment, bucket assembly 202 includes a shell (not shown in FIG. 2) that substantially surrounds shroud 216. While shroud 216 is a relatively thick and robust component, the shell has a relatively small thickness in the exemplary embodiment. Accordingly, shroud 216 provides structural support and the shell provides an aerodynamic profile. FIG. 3 is a schematic top view of two adjacent buckets 208 and a shell 300 surrounding shroud 216. FIG. 4 is a schematic top view of two adjacent buckets 208 and an alternative shell 400 surrounding shroud 216.

As shown in FIGS. 3 and 4, each shell 300 and 400 includes a respective leading edge 302 and 402 and trailing edge 304 and 404. In the embodiment shown in FIG. 3, leading and trailing edges 302 and 304 are oriented substantially parallel to leading edges 224 and 226 and trailing edges 225 and 227 of first and second shroud components 204 and 206. In the embodiment shown in FIG. 3, leading and trailing edges 402 and 404 are oriented obliquely with respect to leading edges 224 and 226 and trailing edges 225 and 227 of first and second shroud components 204 and 206.

Figures 5, 6:
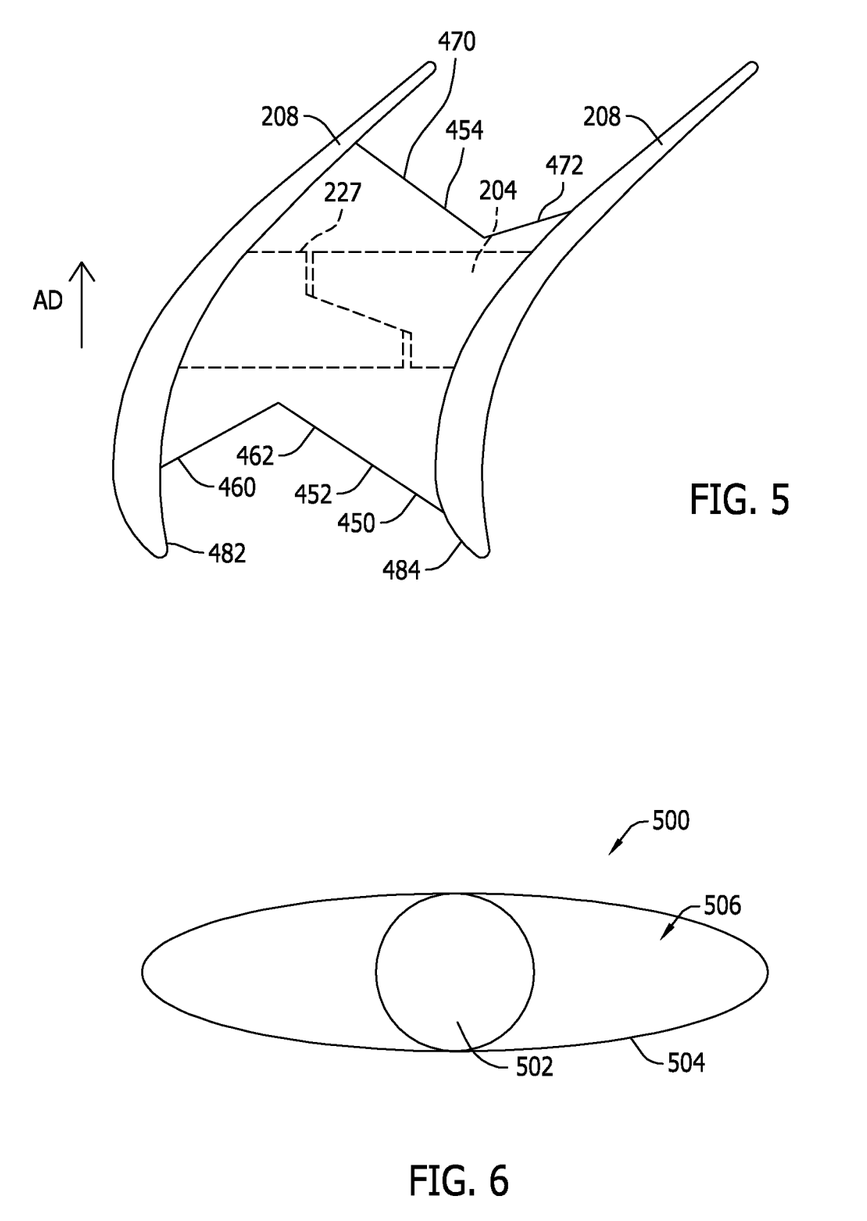
FIG. 5 is a schematic top view of two adjacent buckets and a shell surrounding a shroud that may be used with the rotary assembly shown in FIG. 2.
FIG. 6 is a cross-sectional view of an exemplary assembly including a shroud and a shell that may be used with the rotary assembly shown in FIG. 2.

FIG. 5 is a schematic top view of two adjacent buckets 208 and an alternative shell 450 surrounding shroud 216. In the embodiment shown in FIG. 5, a leading edge 452 and a trailing edge 454 of shell 450 are not entirely linear. Instead, leading edge 452 is formed by a first linear segment 460 and a second linear segment 462 oriented obliquely to first linear segment 460. Similarly, trailing edge 454 is formed by a first linear segment 470 and a second linear segment 472 oriented obliquely to first linear segment 470. The configuration shown in FIG. 5 facilitates maximizing a footprint of shell 450 on a pressure side 482 of one bucket 208 and a suction side 484 of the other bucket 208.

FIG. 6 is a cross-sectional view of an exemplary assembly 500 including a shroud 502 and a shell 504. As shown in FIG. 6, shell 504 substantially surrounds shroud 502. Further, a cavity 506 is defined between shell 504 and shroud 502. Cavity 506 is substantially empty, and facilitates reducing a weight of assembly 500. Notably, although the weight of assembly 500 is relatively low, assembly 500 still provides mechanical support via shroud 502 and an aerodynamic profile via shell 504. In some embodiments, shell 504 does not contact shroud 502 directly, and may be held in place using ridges, locating pins, etc., as described in detail herein. Alternatively, shell 504 may be coupled directly to shroud 502. Shroud 502 has a substantially circular cross-section in the exemplary embodiment. Alternatively, shroud 502 may have any cross-sectional shape (e.g., square, elliptical, etc.) that enables assembly 500 to function as described herein.

Shell 504 may be coupled around shroud 502 in any configuration that enables assembly 500 to function as described herein. Although specific exemplary embodiments of shroud 502 and shell 504 are described herein, those of skill in the art will appreciate that other configurations not specifically identified herein are within the spirit and scope of the disclosure.

Figure 7:
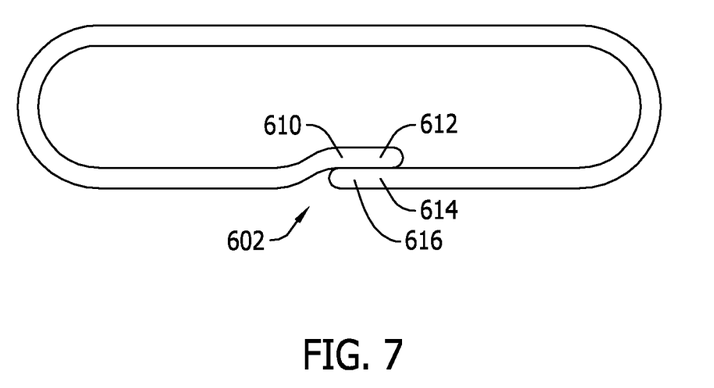
FIG. 7 is a cross-sectional view of an exemplary shell that may be used with the rotary assembly shown in FIG. 2.

FIG. 7 is a cross-sectional view of an exemplary shell 600. In the embodiment shown in FIG. 7, shell 600 includes a snap-fit feature 602 for closing shell 600 around the shroud (not shown in FIG. 7). Specifically, a first end 610 of shell 600 includes a flange 612, and a second end 614 of shell includes a ledge 616. To close shell 600, shell 600 is wrapped around the shroud and first end 610 is snapped over second end 614 such that flange 612 engages ledge 616.

In alternative embodiments, first end 610 and second end 614 may include other features to facilitate closing shell 600. For example, first end 610 may include a hook feature that engages a notch formed in second end 614. In some embodiments, first and second ends 610 and 614 couple shell 600 to the shroud. For example, first and second ends 610 and 614 may each include a hook feature that engages an associated notch formed in the shroud. Further, in some embodiments, at least one of first and second ends 610 and 614 include one or more raised features (not shown) that prevent fluid flowing past shell 600 from contacting and degrading the interface between first and second ends 610 and 614.

Figure 8:
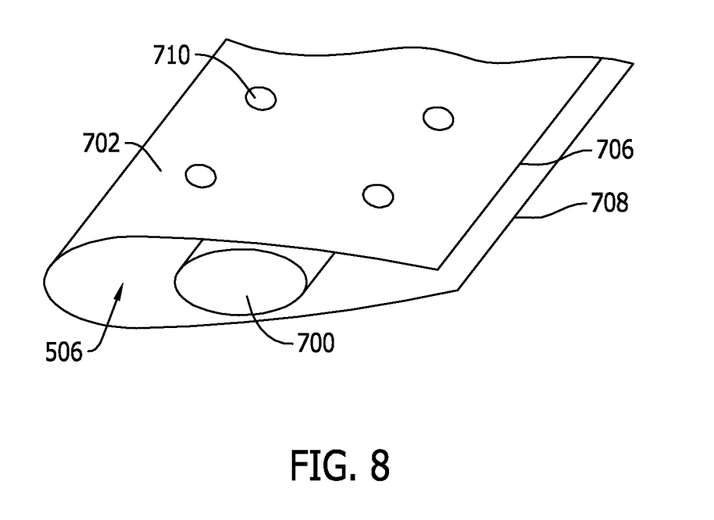
FIG. 8 is a perspective view of a portion of an exemplary shroud and shell that may be used with the rotary assembly shown in FIG. 2.

FIG. 8 is a perspective view of a portion of an alternative exemplary shroud 700 and shell 702. In the embodiment shown in FIG. 8, shell 702 is formed by bending a sheet of material. To create shell 702, the sheet is wrapped around shroud 700, and a first edge 706 of the sheet is coupled to a second edge 708 of the sheet. First and second edges 706 and 708 may be coupled using welding, a braze, a plurality of fasteners, and/or other coupling techniques.

In the embodiment shown in FIG. 8, shell 702 includes a plurality of cooling holes 710 defined therethrough. Cooling holes 710 enable fluid to flow from cavity 506 to an exterior of shell 702, facilitating cooling of shroud 700 and shell 702. In the exemplary embodiment, cooling fluid is pumped through buckets 208 as part of a cooling circuit and discharged into cavity 506. The cooling fluid has a temperature substantially lower than the hot gas path air flowing past assembly 500.

Figure 9:
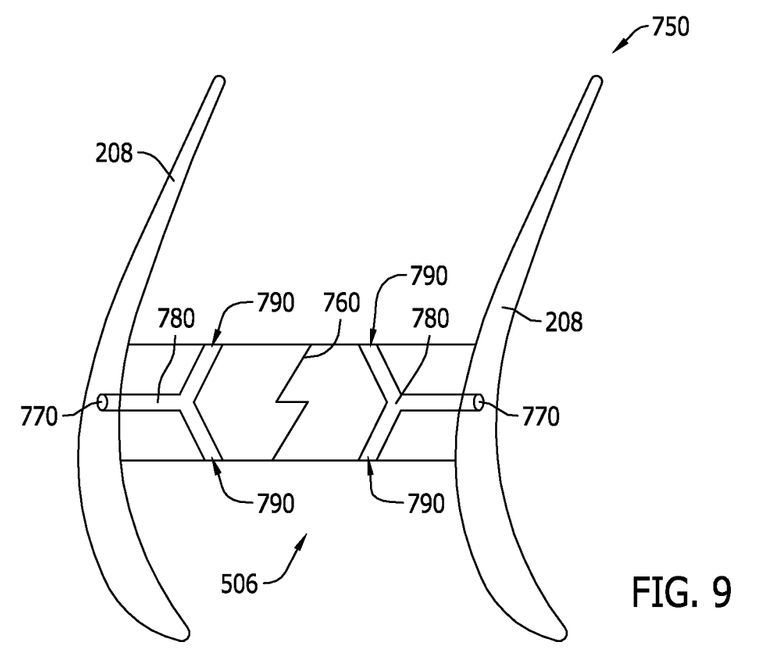
FIG. 9 is a schematic top schematic view of an exemplary cooling assembly that may be used with the rotary assembly shown in FIG. 2.

FIG. 9 is a schematic top schematic view of an exemplary cooling assembly 750. The shell is omitted in FIG. 9 for clarity. As shown in FIG. 9, a shroud 760 extends between two buckets 208. Bucket cooling passages 770 defined in buckets 208 are in fluid communication with shroud cooling passages 780. Accordingly, cooling fluid flows through bucket cooling passages 770 into shroud cooling passages 780, and discharges into cavity 506 through shroud cooling holes 790. After the cooling fluid is discharged into cavity 506, the cooling fluid is purged from cavity 506 through cooling holes 710.

Although cooling holes 710 are shown on a top surface of shell 702, cooling holes 710 may be located on any portion of shell 702 that enables cooling holes 710 to function as described herein. For example, cooling holes 710 may be located on a trailing edge of shell 702 and/or located at an interface between the buckets and shell 702. Further, although cooling holes 710 are shown as being substantially circular, cooling holes 710 may have any suitable shape (e.g., elliptical, teardrop, etc.) that facilitates cooling. Moreover, at cooling holes 710, shell 702 may have a predetermined thickness to facilitate guiding a flow of cooling fluid therethrough.

Figure 10:
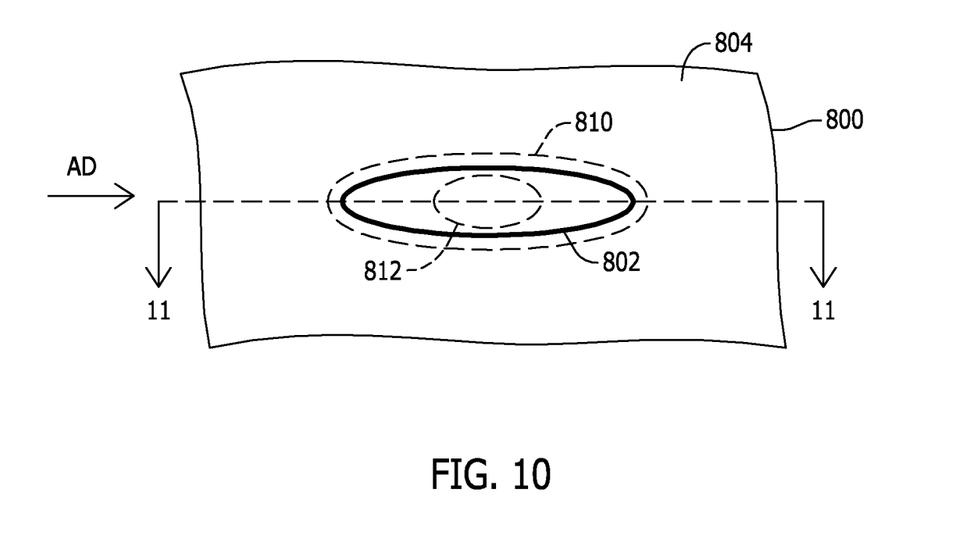
FIG. 10 is a side view of an exemplary bucket that may be used with the rotary assembly shown in FIG. 2.
Figure 11:
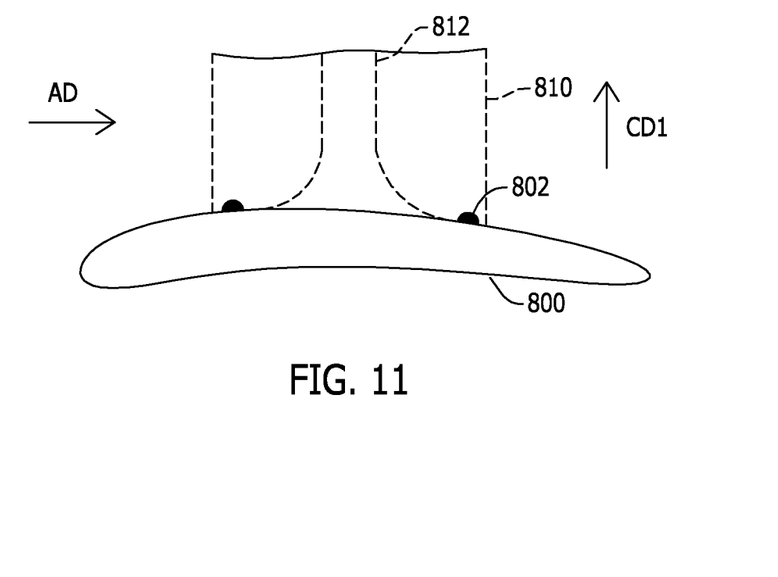
FIG. 11 is a cross-sectional view of the bucket shown in FIG. 10 and taken along line 11-11.

FIG. 10 is a side view of an exemplary bucket 800, such as bucket 208 (shown in FIG. 2). FIG. 11 is a cross-sectional view of bucket 800 taken along line 11-11 shown in FIG. 10. In the embodiment shown in FIGS. 10 and 11, bucket 800 includes a ridge 802 that extends outward from a surface 804 of bucket 800. In the exemplary embodiment, ridge 802 is generally elliptical. Alternatively, ridge 802 may have any shape that enables bucket 800 to function as described herein. Ridge 802 facilitates positioning a shell 810 around a shroud 812. Specifically, shell 810 fits over ridge 802, and ridge 802 maintains a position of shell 810. The locations of shell 810 and shroud 812 are shown in dashed lines for clarity.

Figure 12:
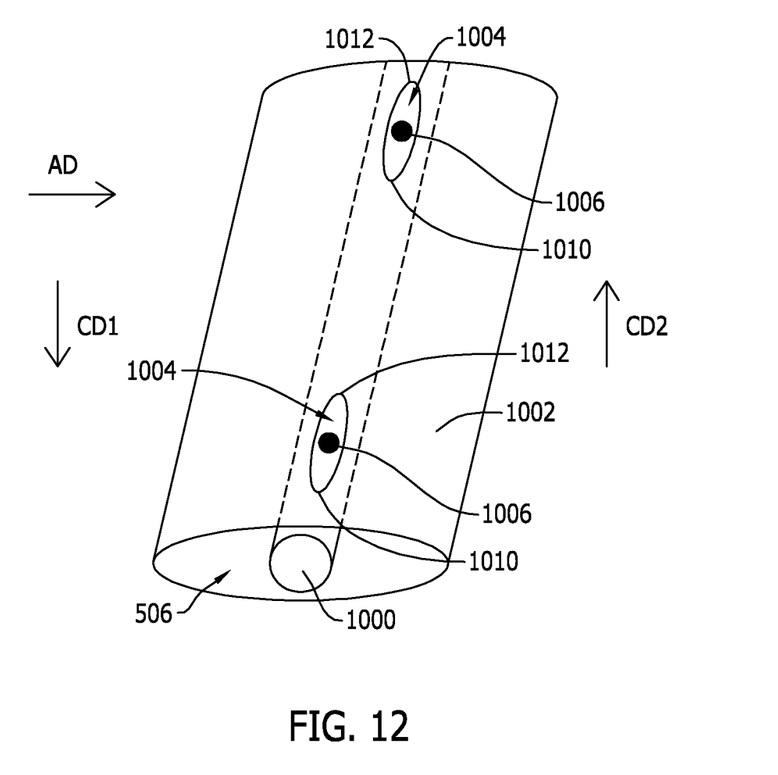
FIG. 12 is a perspective view of an exemplary shroud and shell that may be used with the rotary assembly shown in FIG. 2.

FIG. 12 is a perspective view of an exemplary shroud 1000 and shell 1002. In the embodiment shown in FIG. 12, shell 1002 includes at least one elongated slot 1004 defined therein. Specifically, elongated slot 1004 extends in first and second circumferential directions CD1 and CD2. Shroud 1000 includes at least one pin 1006 extending therefrom. Elongated slot 1004 receives an associated pin 1006 such that pin 1006 is moveable within elongated slot 1004. Accordingly, shroud 1000 and shell 1002 are moveable relative to one another in first and second circumferential directions CD1 and CD2, but substantially immobile relative to one another in axial direction AD. Further, elongated slot 1004 is defined by a first stop 1010 and a second stop 1012 that constrain motion of pin 1006 in first and second circumferential directions CD1 and CD2, respectively.

Figure 13:
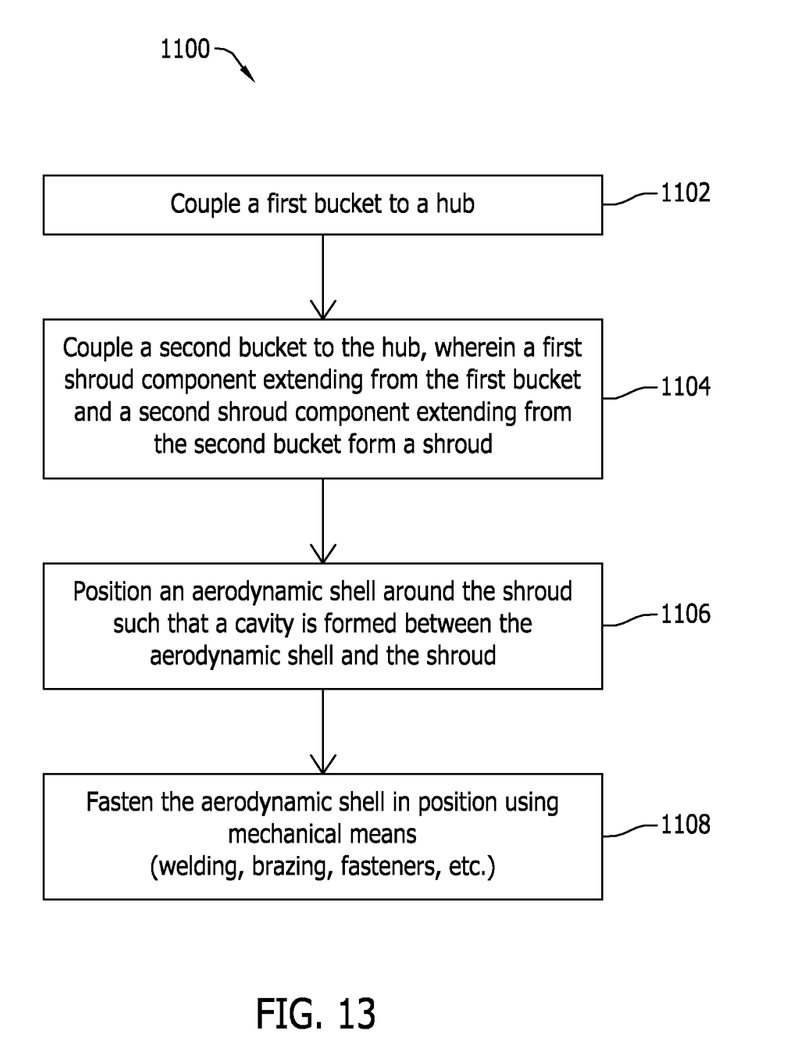
FIG. 13 is a flowchart of an exemplary method that may be used to assemble the rotary assembly shown in FIG. 2.

FIG. 13 is a flowchart of an exemplary method 1100 for assembling a rotary assembly, such as rotary assembly 200 (shown in FIG. 2). A first bucket, such as one of buckets 208 (shown in FIG. 2), is coupled 1102 to a hub, such as hub 209 (shown in FIG. 2). A second bucket is coupled 1104 to the hub such that a first shroud component, such as first shroud component 204 (shown in FIG. 2), and a second shroud component, such as second shroud component 206 (shown in FIG. 2), form a shroud, such as shroud 216 (shown in FIG. 2). An aerodynamic shell, such as shell 300 (shown in FIG. 3), is positioned 1106 around the shroud such that a cavity, such as cavity 506 (shown in FIG. 6), is formed between the aerodynamic shell and the shroud. The aerodynamic shell is fastened 1108 in position by mechanical means such as, but not limited to, welding, brazing, fasteners etc.

As compared to at least some known rotary assemblies that include one or more part-span connectors that attempt to balance mechanical and aerodynamic considerations in a single part, the assemblies described herein include a shroud for mechanical support and a separate shell for aerodynamics. A cavity formed between the shroud and the surrounding shell reduces the weight of the assembly as compared to at least some known rotary assemblies. Accordingly, by decoupling the mechanical and aerodynamic functions into the shroud and shell, respectively, the assemblies described herein may be less expensive to manufacture and lighter than at least some known rotary assemblies.

The embodiments described herein provide an aerodynamic shell that substantially encircles a shroud extending between two buckets. The shroud provides mechanical support for the buckets, while the aerodynamic shell provides an aerodynamic profile that facilitates fluid flow. A cavity defined between the shell and the shroud enables the assembly to be relatively light-weight while still providing sufficient mechanical and aerodynamic characteristics.

Exemplary embodiments of systems and methods for bucket assemblies are described above in detail. The systems and methods described herein are not limited to the specific embodiments described herein, but rather, components of the systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An assembly for use in a turbine engine, said assembly comprising:
   a first bucket;
   a second bucket circumferentially adjacent to said first bucket;
   a shroud extending between said first and second buckets, said shroud comprising:
      a first shroud component extending from said first bucket; and
      a second shroud component extending from said second bucket; and a unitary aerodynamic shell substantially encircling said first shroud component and said second shroud component such that a single cavity is formed between said aerodynamic shell and said first and second shroud components.

2. An assembly in accordance with claim 1, wherein said shroud is configured to provide mechanical support for said first and second buckets, and wherein said aerodynamic shell comprises an aerodynamic surface that facilitates fluid flow past said assembly.

3. An assembly in accordance in claim 1, further comprising at least one cooling passage defined in said shroud, said at least one cooling passage providing fluid communication between an interior of said first bucket and the cavity.

4. An assembly in accordance with claim 1, further comprising at least one cooling hole defined in said aerodynamic shell, said at least one cooling hole providing fluid communication between the cavity and an exterior of said aerodynamic shell.

5. An assembly in accordance with claim 1, wherein said aerodynamic shell comprises:
a first end; and
a second end coupled to said first end in a snap-fit engagement.

6. An assembly in accordance with claim 1, wherein said first and second buckets each comprise a ridge that engages said aerodynamic shell to facilitate maintaining a position of said aerodynamic shell.

7. An assembly in accordance with claim 1, wherein said aerodynamic shell comprises at least one elongated slot, and wherein said shroud comprises at least one pin that is received in said at least one elongated slot.

8. A rotary assembly comprising:
a rotor shaft;
a hub coupled to said rotor shaft;
a plurality of buckets coupled to said hub such that said buckets extend radially outward from said rotor shaft;
a shroud extending between a first bucket of said plurality of buckets and a second bucket of said plurality of buckets, said shroud comprising:
a first shroud component extending from said first bucket; and
a second shroud component extending from said second bucket; and
a unitary aerodynamic shell substantially encircling said first shroud component and said second shroud component such that a single cavity is formed between said aerodynamic shell and said first and second shroud components.

9. A rotary assembly in accordance with claim 8, wherein said shroud is configured to provide mechanical support for said first and second buckets, and wherein said aerodynamic shell comprises an aerodynamic surface that facilitates fluid flow past said rotary assembly.

10. A rotary assembly in accordance in claim 8, further comprising at least one cooling passage defined in said shroud, said at least one cooling passage providing fluid communication between an interior of said first bucket and the cavity.

11. A rotary assembly in accordance with claim 8, further comprising at least one cooling hole defined in said aerodynamic shell, said at least one cooling hole providing fluid communication between the cavity and an exterior of said aerodynamic shell.

12. A rotary assembly in accordance with claim 8, wherein said aerodynamic shell comprises a leading edge and a trailing edge, at least one of said leading edge and said trailing edge comprising a first linear portion and a second linear portion oriented obliquely with respect to said first linear portion.

13. A rotary assembly in accordance with claim 8, wherein said first and second buckets each comprise a ridge that engages said aerodynamic shell to facilitate maintaining a position of said aerodynamic shell.

14. A rotary assembly in accordance with claim 8, wherein said aerodynamic shell comprises at least one elongated slot, and wherein said shroud comprises at least one pin that is received in said at least one elongated slot.

15. A method of assembling a rotary assembly, said method comprising:
coupling a first bucket to a hub, the first bucket including a first shroud component extending from the first bucket;
coupling a second bucket to the hub, the second bucket including a second shroud component extending from the second bucket, wherein a first shroud component and a second shroud component form a shroud; and
positioning a unitary aerodynamic shell around the first shroud component and the second shroud component such that a single cavity is formed between the aerodynamic shell and the first and second shroud components.

16. A method in accordance with claim 15, wherein positioning an aerodynamic shell comprises positioning the aerodynamic shell such that at least one pin formed on the shroud is received in at least one elongated slot defined in the aerodynamic shell.

17. A method in accordance with claim 15, wherein positioning an aerodynamic shell comprises fitting the aerodynamic shell over a ridge formed on at least one of the first bucket and the second bucket.

18. A method in accordance with claim 15, further comprising coupling a first edge of the aerodynamic shell to a second edge of the aerodynamic shell such that the aerodynamic shell substantially encircles the shroud.

* * * * *